United States Patent
Chippa et al.

(10) Patent No.: US 9,942,096 B2
(45) Date of Patent: Apr. 10, 2018

(54) ABSTRACTION LAYER AND DISTRIBUTION SCOPE FOR A LOGICAL SWITCH ROUTER ARCHITECTURE

(71) Applicant: International Business Machines Corporation, Armonk, NY (US)

(72) Inventors: Ashok N. Chippa, Mountain View, CA (US); Ioana M. Costea, San Jose, CA (US); Vijoy A. Pandey, San Jose, CA (US); Daljeet Singh, Watsonville, CA (US); Ethan M. Spiegel, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/467,223

(22) Filed: Mar. 23, 2017

(65) Prior Publication Data
US 2017/0195219 A1    Jul. 6, 2017

Related U.S. Application Data

(63) Continuation of application No. 14/319,805, filed on Jun. 30, 2014, now Pat. No. 9,667,494.

(51) Int. Cl.
| | |
|---|---|
| *G06F 15/173* | (2006.01) |
| *H04L 12/24* | (2006.01) |
| *H04L 12/771* | (2013.01) |
| *H04L 12/715* | (2013.01) |
| *H04L 12/751* | (2013.01) |

(52) U.S. Cl.
CPC ......... *H04L 41/0823* (2013.01); *H04L 45/02* (2013.01); *H04L 45/56* (2013.01); *H04L 45/64* (2013.01)

(58) Field of Classification Search
CPC ......... H04L 45/56; H04L 45/64; H04L 45/02; H04L 41/0823
USPC .......................................................... 709/223
See application file for complete search history.

(56) References Cited

U.S. PATENT DOCUMENTS

| | | | |
|---|---|---|---|
| 5,844,553 A | * 12/1998 | Hao | ............ G06F 9/4443 709/201 |
| 7,489,127 B2 | 2/2009 | Bauer | |

(Continued)

OTHER PUBLICATIONS

Appendix P (List of IBM Patents or Patent Applications Treated as Related), 2 pages, filed herewith.

(Continued)

*Primary Examiner* — Phuoc Nguyen
(74) *Attorney, Agent, or Firm* — Alexander G. Jochym (57) ABSTRACT

A tool for forwarding plane support in a distributed system utilizing a three-tiered architecture. The tool receives one or more messages, wherein the one or more messages include a plurality of state information. The tool determines a distribution scope for the one or more messages based, at least in part, on the plurality of state information. The tool determines a destination endpoint ID for the one or more messages, wherein the destination endpoint ID identifies one or more switch units to receive the one or more messages. The tool sends the one or more messages to a forwarding plane agent for distribution to the one or more switch units based, at least in part, on the distribution scope and the destination endpoint ID.

14 Claims, 6 Drawing Sheets

(56) References Cited

U.S. PATENT DOCUMENTS

| | | | |
|---|---|---|---|
| 8,023,504 B2* | 9/2011 | Shah | H04L 45/00 370/389 |
| 2003/0128668 A1 | 7/2003 | Yaratkar | |
| 2004/0136371 A1 | 7/2004 | Muralidhar | |
| 2005/0108416 A1* | 5/2005 | Khosravi | H04L 45/00 709/232 |
| 2009/0116483 A1* | 5/2009 | Anumala | H04L 12/4641 370/392 |
| 2010/0293200 A1 | 11/2010 | Assarpour | |
| 2012/0158942 A1 | 6/2012 | Kalusivalingam et al. | |
| 2013/0060940 A1 | 3/2013 | Koponen | |
| 2013/0103817 A1 | 4/2013 | Koponen | |
| 2013/0297798 A1* | 11/2013 | Arisoylu | H04L 67/1027 709/226 |
| 2014/0075049 A1* | 3/2014 | Liu | H04L 41/04 709/244 |
| 2015/0032871 A1* | 1/2015 | Allan | H04L 47/125 709/223 |
| 2016/0173338 A1* | 6/2016 | Wolting | H04L 41/145 709/223 |

OTHER PUBLICATIONS

U.S. Appl. No. 14/319,805, filed Jun. 30, 2014,—This Document Is Not Provided Because It Is Readily Available to the Examiner.

* cited by examiner

ABSTRACTION LAYER AND DISTRIBUTION SCOPE FOR A LOGICAL SWITCH ROUTER ARCHITECTURE

FIELD OF THE INVENTION

The present invention relates generally to data networking and more particularly to a hardware abstraction layer and a distribution scope for transferring data from a networking control plane to a forwarding plane.

BACKGROUND OF THE INVENTION

Software for data networking is often organized into three layers: a forwarding plane, a control plane, and a management plane. The forwarding plane, which is responsible for progressing user data traffic, receives packets, parses packet headers, and uses the information from the packet headers along with its local state information to determine how to forward the packets. The forwarding plane includes software that receives local state information from the control plane, and programs the local state information in the hardware or software forwarding path. The control plane consists of protocols and applications that exchange and receive abstracted state information between different data networking systems. The management plane allows users and management systems to allocate networking system resources, selecting between different possible networking equipment behaviors.

SUMMARY

Aspects of the present invention disclose a method and computer program product for forwarding plane support in a distributed system utilizing a three-tiered architecture. The method includes receiving, by one or more computer processors, one or more messages, wherein the one or more messages include a plurality of state information. The method includes determining, by the one or more computer processors, a distribution scope for the one or more messages based, at least in part, on the plurality of state information, wherein the distribution scope is selected from a group consisting of: a global distribution scope, an interface distribution scope, a virtual local area network (VLAN) distribution scope, a virtual routing and forwarding instance (VRF) distribution scope, and a specific logical switch router (LSR) distribution scope. The method includes determining, by the one or more computer processors, a destination endpoint ID for the one or more messages, wherein the destination endpoint ID identifies one or more switch units to receive the one or more messages. The method includes sending, by the one or more computer processors, the one or more messages to a forwarding plane agent for distribution to the one or more switch units based, at least in part, on the distribution scope and the destination endpoint ID.

DETAILED DESCRIPTION

Embodiments of the present invention recognize that in a data networking system, a common implementation includes a centralized control plane, including applications and protocols, along with a distributed forwarding plane, including multiple interconnected switch units or line cards.

Embodiments of the present invention provide the capability to distribute local state information for the forwarding plane to multiple switch units or line cards by utilizing a three-tiered software architecture.

Implementation of such embodiments may take a variety of forms, and exemplary implementation details are discussed subsequently with reference to the Figures.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
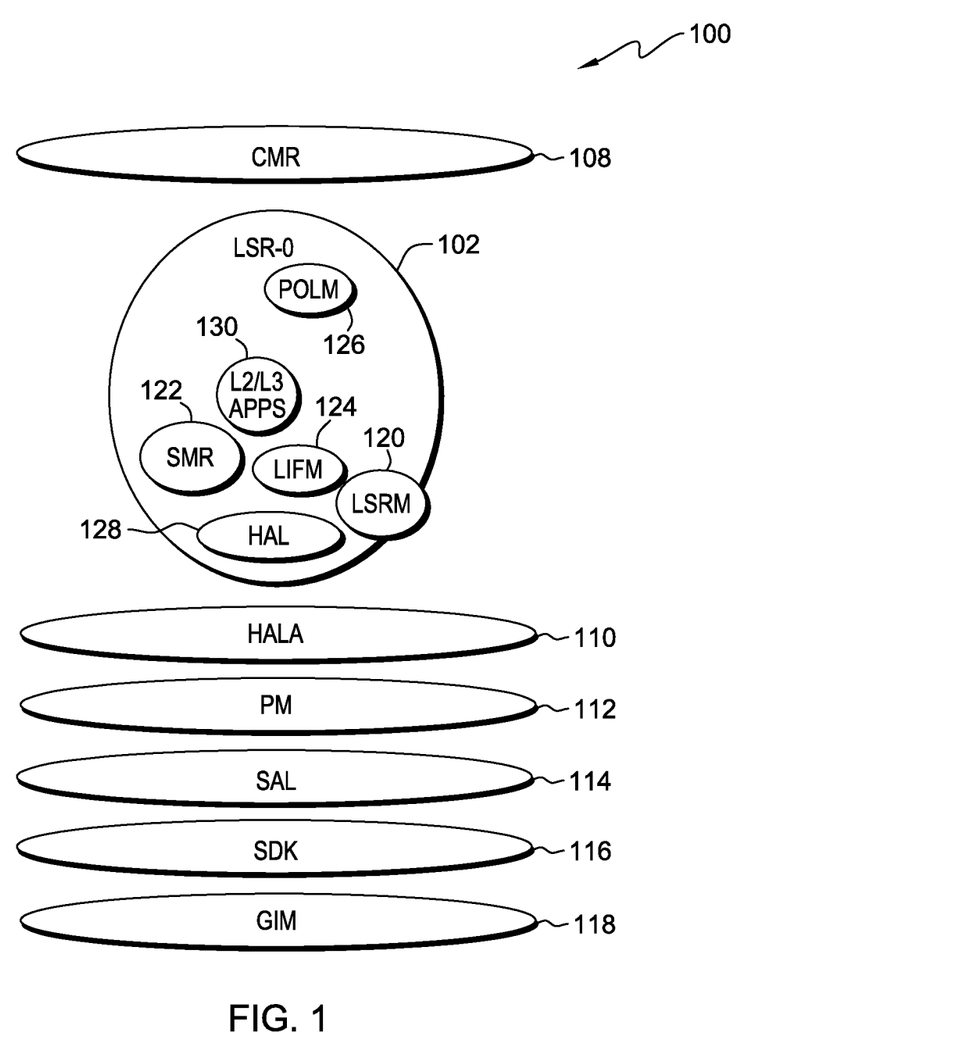
FIG. 1 illustrates a logical switch router (LSR) architecture within a data processing system, generally designated 100, in accordance with an embodiment of the present invention.

The present invention will now be described in detail with reference to Figures. FIG. 1 illustrates a logical switch router (LSR) architecture within a data processing system, generally designated 100, including a default logical switch router (LSR-0) 102, a configuration, management, and reporting client (CMR) 108, a port manager (PM) 112, a hardware abstraction layer agent (HALA) 110, a SDK software abstraction layer (SAL) 114, a software development kit (SDK) 116, and a global index manager (GIM) 118.

In the exemplary embodiment, LSR-0 102 is an administrative logical switch router initially created by the networking system. LSR-0 102 cannot be deleted, and is responsible for managing additional non-default logical switch routers, such as LSR-1 and LSR-2 (not-shown). In the exemplary embodiment, the LSR environment is port/virtual port (vport) based, such that each port/vport can belong to only one LSR. All physical ports belong to LSR-0 102 until assigned to one or more non-default logical switch routers, for example LSR-1 and LSR-2. Initially, vports will not be present in the LSR environment. Vports are created by user configuration or via protocol negotiation. In another embodiment, data processing system 100 can include multiple LSRs, such as LSR-1 and LSR-2 (not shown), as well as multiple forwarding planes (not shown).

In the exemplary embodiment, LSR-0 102 includes LSRM 120, a key process, operating on the master (as well as the backup) switch, responsible for LSR management, including hardware resource (e.g., port) assignment and management, a service manager (SMR) 122, a software module responsible for launch and monitoring of software processes, a logical interface manager (LIFM) 124, a policy manager (POLM) 126, a hardware abstraction layer (HAL) 128, and L2 and L3 level applications (apps) 130. On the data plane, there is no direct communication between two LSRs on the same switch. Communication between two LSRs on the same switch is possible through external connectivity.

In the exemplary embodiment, SMR 122 is one instance per LSR. SMR 122 launches all software processes with each LSR via a configuration file associated with each process (e.g., application). In each LSR, processes can be launched automatically or launched by user configuration, i.e., CMR 108 signals SMR 122 when a user request is issued. SMR 122 launches processes as defined by the configuration file associated with the process. For example, if a process is implemented in a distributed way, and is launched per user configuration, SMR 122 sends the request to all other switches to launch the process in a particular LSR. Policies for monitoring and restart are defined per process.

In the exemplary embodiment, LIFM 124 is a software module capable of handling logical interface (LIF) related management. A LIF can represent a physical interface, a virtual interface, a port-channel, a routed virtual interface (RVI), a loopback, etc. A LIF database in shared memory (not shown) is maintained in LIFM 124. In the exemplary embodiment, one instance of LIFM 124 operates within each LSR in the LSR environment.

In the exemplary embodiment, POLM 126 is a software module responsible for management of policies including access control lists, quality of service (QoS), and control plane protection. In the exemplary embodiment, one instance of POLM 126 operates within each LSR in the LSR environment.

In the exemplary embodiment, HAL 128 is a software module responsible for hardware programming in the LSR environment. HAL 128 includes a set of routines that emulate platform specific details that provide other software modules and applications access to hardware resources. These hardware resources may be distributed across multiple switch units or line cards within the system.

In the exemplary embodiment, L2 and L3 applications (apps) 130 include a plurality of L2 and L3 level applications that support graceful shutdown (i.e., all resources are freed, such as those indices allocated through GIM 118, and the hardware resources underpinning the control, data, and management planes are cleaned up before the application terminates). Apps 130 support a restart capability to provide high availability (HA) functionality (i.e., capability to back up and restart if failure occurs).

In the exemplary embodiment, the LSR environment includes hardware support (e.g., VRF, LN support on FDB, etc.) for traffic isolation between different LSRs on the data plane.

HALA 110 is a software module responsible for maintaining a view of all state information driving programming of one switch unit in the distributed system. Specific HAL agents operate on a specific switch unit of the one or more switch units in the distributed system. HALA 110 can include an interface agent (IFA), a policy agent (POLA), and L2/L3 agents. In the exemplary embodiment, IFA is a software module responsible for managing mapping between logical interfaces (LIFs) and hardware ports, and programming of LIFs in hardware through SAL 114 and SDK 116. IFA operates as one instance of IFA per switch or line card. L2/L3 agents are software modules responsible for handling of L2/L3 forwarding tables within a switch unit or line card, including, without limitation, L3 forwarding information base (FIB) and L2 forwarding database (FDB). Each L2/L3 agent operates as one instance per switch unit or line card. POLA is a software module responsible for handling of policies within a switch unit or line card, including, without limitation, access control lists, quality of service (QoS), and control plane protection. POLA operates as one instance of POLA per switch unit or line card. In another embodiment, data processing system 100 can include one or more of HALA 110, each of the one or more HALA 110 maintaining respective components IFA, POLA, and L2/L3 agents.

PM 112 is a software module responsible for port management. PM 112 manages physical port and virtual port (i.e., channel) assignment in the LSR environment. A port database in shared memory (not shown) is maintained in PM 112. PM 112 is responsible for index assignment for hardware resources, such as LAG, multicast, spanning-tree-instance, etc., and is also responsible for enforcement of hardware resource policies for LSR-0 102. PM 112 is a global process with each switch having only one instance of PM 112 operating on it.

SDK adaption layer (SAL) 114 is a wrapper around the hardware specific SDK 116. SAL presents platform independent APIs to one or more HAL agents, hiding the difference between different SDKs for different hardware chipsets that may be present on different switch units or line cards present within the system. SAL operates as one instance of SAL per switch unit or line card.

SDK 116 is a software module responsible for software development of the network chips in the LSR environment. SDK 116 operates as one instance of SDK 116 per switch unit or line card.

GIM 118 is a software module responsible for index assignment for hardware resources such as LAG, multicast, spanning-tree-instance, etc. GIM 118 manages enforcement of hardware resource polices for one or more LSRs in the LSR system. GIM 118 is a global process with each switch having only one instance of GIM 118 operating on it.

LSR-0 102 includes multiple processes operating locally within the LSR.

In another embodiment, multiple LSR and multiple forwarding plane instances are supported in the LSR environment.

Figure 2:
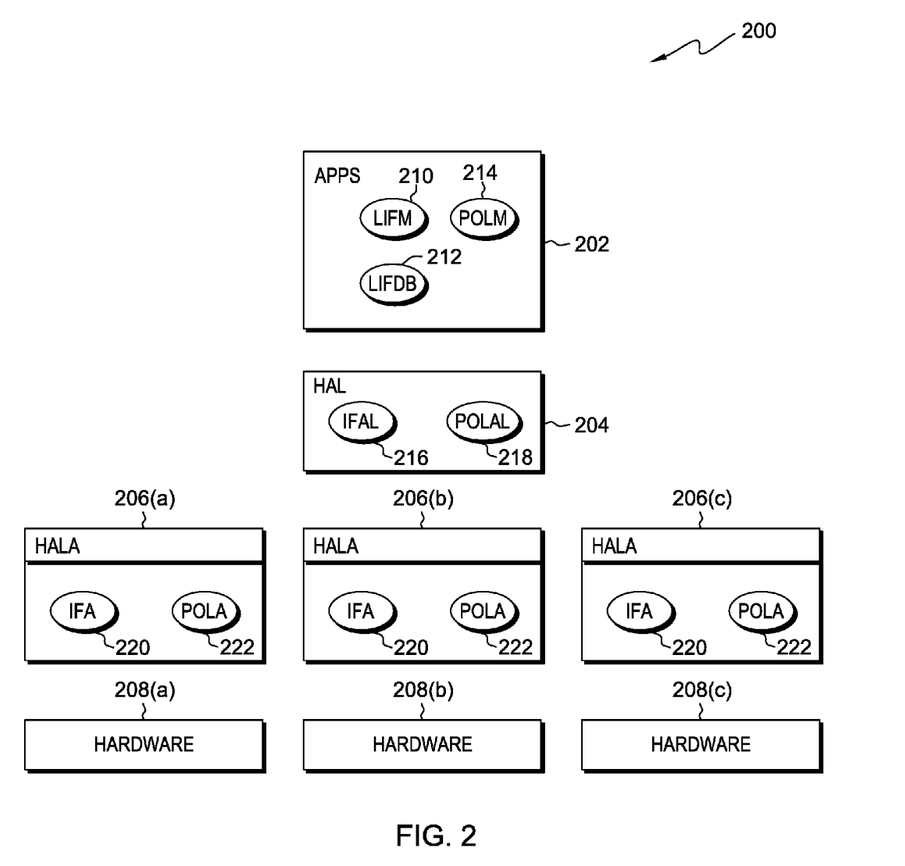
FIG. 2 depicts a block diagram illustrating a three-tiered software architecture, including a switch control plane application layer (apps) 202, a hardware abstraction layer (HAL) 204, and one or more hardware abstraction layer agents (HALA) 208, for forwarding plane support in a distributed system, in accordance with an exemplary embodiment of the present invention.

FIG. 2 depicts a block diagram, generally designated 200, illustrating a three-tiered software architecture, including an application layer (APPS) 202, a hardware abstraction layer (HAL) 204, and one or more hardware abstraction layer agents (HALA) 206, for forwarding plane support in a distributed system, in accordance with an exemplary embodiment of the present invention.

In the exemplary embodiment, an application layer (APPS) 202 includes control plane components in the distributed system. APPS 202 includes information regarding specific switch units, however, in general, it is desirable to conceal information regarding the specific switch units from applications in APPS 202. Instead, applications in APPS 202 should have a view of a single system with a plurality of interfaces. The applications in APPS 202 should not be concerned about connectivity between one or more interfaces included within the distributed system.

In the exemplary embodiment, APPS 202 includes a logical interface manager (LIFM) 210, a logical interface database (LIFDB) 212, and a policy manager (POLM) 214. In another embodiment, APPS 202 can include L2 and L3 applications (not shown). In the exemplary embodiment, one or more application components included within APPS 202 send state information to one or more corresponding components included within HAL 204, without any direct indication of which switch unit or line card the state information should be distributed to. In the exemplary embodiment, LIFM 210 interfaces with protocols and applications, providing a common view of a plurality of interfaces, where the plurality of interfaces include, but are not limited to, a physical interface, a virtual interface, a link aggregation group (LAG), a routed virtual interface (RVI), a loopback, a tunnel, or a CPU port. LIFM 210 manages LIFDB 212 in shared memory that the plurality of applications in APPS 202 and HAL 204 can access to read and write attributes on logical interfaces (LIFs). Attributes are accessed through APIs provided by an interface management subsystem included within the distributed system. For example, one such attribute included in LIFDB 212 may be a plurality of switch units where the plurality of interfaces is located.

In the exemplary embodiment, HAL 204 is a software module responsible for controlling and managing the distribution of messages from the control plane to the forwarding plane. In the exemplary embodiment, distribution of one or more messages from the control plane to the distributed forwarding plane is controlled by one or more distribution scopes. HAL 204 determines a plurality of hardware abstraction layer policies, indicating the one or more distribution scopes (e.g., all switch units global scope, interface scope, LSR scope, etc.), for a plurality of state information to be distributed to one or more switch units in the forwarding plane. For example, state information from HAL 204 may include common infrastructure information to determine how to forward messages according to a specific distribution scope.

In the exemplary embodiment, the one or more distribution scopes vary depending on the underlying rationale for determining which switch units should receive the message. In the exemplary embodiment, the one or more distribution scopes can include, without limitation, a distribution scope for specifying program instructions to distribute the one or more messages to one or more switch units having a specific interface, a distribution scope for specifying program instructions to distribute the one or more messages to one or more switch units having a specific virtual local area network (VLAN), a distribution scope for specifying program instructions to distribute the one or more messages to one or more switch units having a specific virtual routing and forwarding instance (VRF), and a distribution scope for specifying program instructions to distribute the one or more messages to one or more switch units having a specific logical switch router (LSR). In the exemplary embodiment, an all switch units global distribution scope is a distribution scope that will result in the broadest message destined for all switch units present in the distributed system. For example, information subject to the all switch units global distribution scope may be basic interface information, such as information relating to entries in hardware that refer to remote interfaces residing on one or more switch units or line cards in the distributed system. In the exemplary embodiment, an interface distribution scope is a distribution scope that will result in distributing messages only to switch units or line cards where a specified interface resides. For example, in the case of physical interfaces, channels, and virtual interfaces, the interface distribution scope will result in a unicast message to a particular switch unit or line card. In the case of LAGs and RVIs, the interface distribution scope will result in a multicast message that may be destined for one or more of the switch units or line cards included within the distributed system. In the exemplary embodiment, a VLAN distribution scope is a distribution scope that results in distributing the one or more messages only to switch units or line cards where interfaces participating in a specific VLAN reside. In the exemplary embodiment, a VRF distribution scope is a distribution scope that results in distributing the one or more messages only to switch units or line cards where interfaces participating in a specific VRF reside.

In the exemplary embodiment, HAL 204 is responsible for distribution of state information from the control plane to the distributed forwarding plane. HAL 204 determines how to distribute the state information provided by APPS 202 to the one or more corresponding HAL agents in HALA 206 for distribution to the one or more switch units in the distributed system.

In the exemplary embodiment, HAL 204 includes an interface abstraction layer (IFAL) 216 and a policy abstraction layer (POLAL) 218. In another embodiment, HAL 204 can include L2/L3 abstraction layers (not shown). In the exemplary embodiment, IFAL 216, POLAL 218, and L2/L3 abstraction layers are responsible for determining, based, at least in part on, the message type of one or more messages, which distribution scope controls the destination of the one or more messages by extracting state information from the one or more messages.

In the exemplary embodiment, each of HALA 206(*a*), (*b*), and (*c*) is responsible for maintaining a view of all state information driving programming of one switch unit in the distributed system. Specific HAL agents operate on a specific switch unit of the one or more switch units in the distributed system.

In the exemplary embodiment, each of HALA 206 includes an interface agent (IFA) 220 and a policy agent (POLA) 222. In another embodiment, HALA 206 can include L2/L3 agents (not shown). In the exemplary embodiment, IFA 220, POLA 222, and L2/L3 agents are responsible for receiving the one or more messages, wherein the messages are defined by a constructed destination endpoint ID that maps to a subset of the switch units in the distributed system.

In the exemplary embodiment, each of hardware 208(*a*), (*b*), and (*c*) represents one switch unit included within the distributed system. Each of hardware 208 corresponds to each of HALA 206 respectively. For example, hardware 208(*a*) corresponds with HALA 206(*a*).

Figure 3:
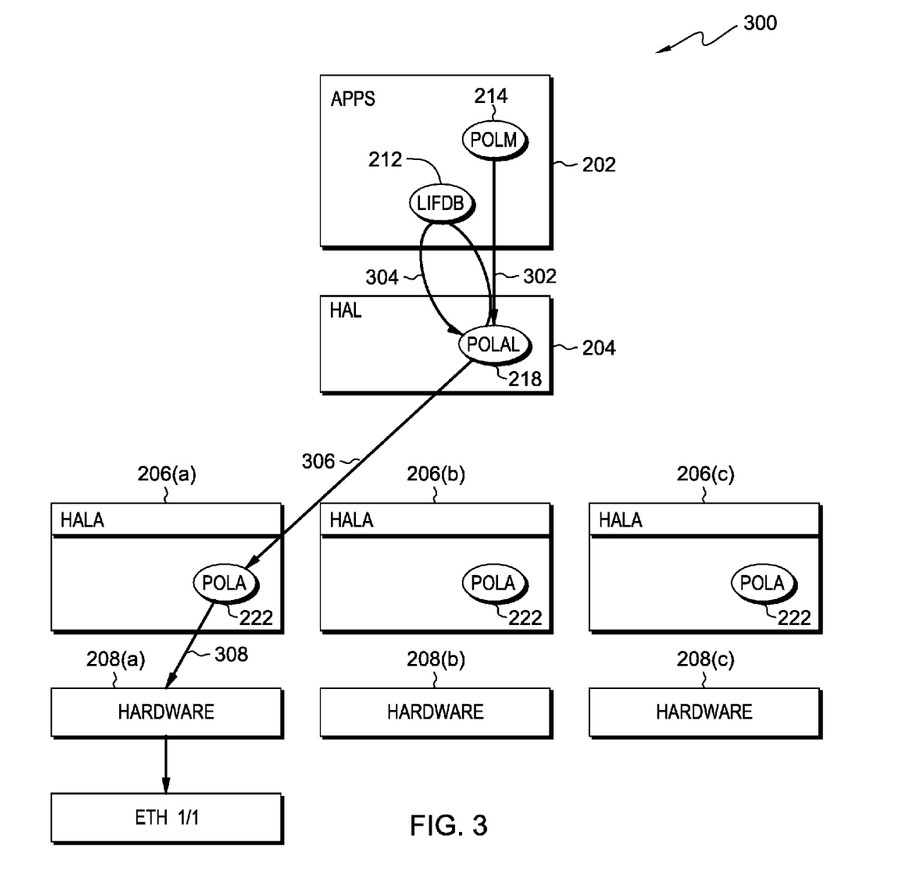
FIG. 3 depicts a functional flow diagram illustrating the steps for unicast distribution using an interface distribution scope, in accordance with an embodiment of the present invention.

FIG. 3 depicts a functional flow diagram, generally designated 300, illustrating the steps for unicast distribution using an interface distribution scope, in accordance with an embodiment of the present invention.

POLAL 218 in HAL 204 receives a message "hal_policy_create (eth 1/1, policy x)" from POLM 214 in APPS 202 (step 302).

POLAL 218 in HAL 204 determines a distribution scope and a destination endpoint ID for the message "halag_policy_create (eth 1/1, policy x) (step 304). In the exemplary embodiment, POLAL 218 in HAL 204 determines a distribution scope for the message "halag_policy_create (eth 1/1, policy x)" based, at least in part on, the received message type, in this case "hal_policy_create". In the exemplary embodiment POLAL 218 in HAL 204 determines a destination endpoint ID for the message "halag_policy_create (eth 1/1, policy x)" based, at least in part on, executing a common function "construct_nisc_epid_interface_scope (interface, local_id)". In the exemplary embodiment, POLAL 218 in HAL 204 determines the destination endpoint ID, based, at least in part on, the interface (i.e., eth 1/1), a local ID (i.e., NISC_EP_POLICY_AGENT), and the one switch unit retrieved from LIFDB 212 in APPS 202 corresponding with entry "eth 1/1" (i.e., unicast ID) in LIFDB 212 in APPS 202.

POLAL 218 in HAL 204 sends the message "halag_policy_create (eth 1/1, policy x)" to the correct policy agent for the interface (i.e., eth1/1), such as POLA 222 of HALA 206(*a*) (step 306).

POLA 222 of HALA 206(*a*) sends the message "sal_policy_create (eth 1/1, policy x)" to the corresponding switch unit in hardware 208(*a*) for eth1/1 for programming (step 308).

Figure 4:
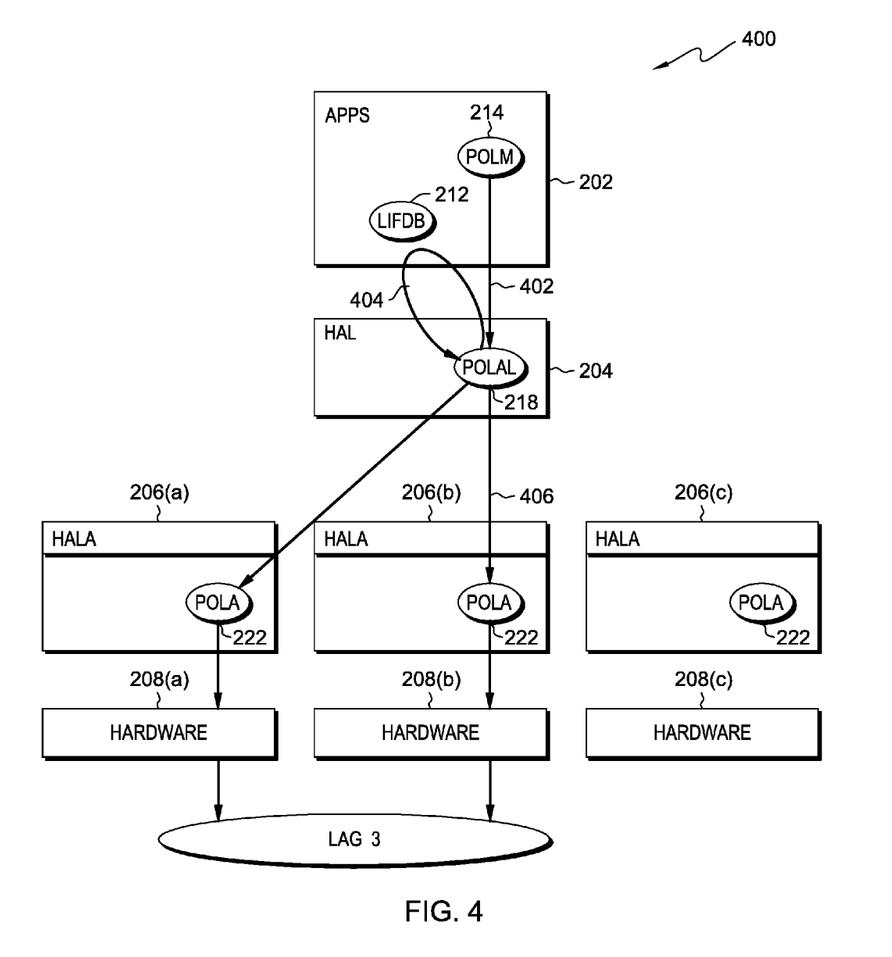
FIG. 4 depicts a functional flow diagram illustrating the steps for multicast distribution using an interface distribution scope, in accordance with an embodiment of the present invention.

FIG. 4 depicts a functional flow diagram, generally designated 400, illustrating the steps for multicast distribution using an interface distribution scope, in accordance with an embodiment of the present invention. For interface types where one or more interfaces reside on a plurality of switch units, multicast group IDs are used to specify the plurality of switch units within a destination endpoint ID address. Multicast distribution service interfaces including, but not limited to, link aggregation groups (LAGs) and routed virtual interfaces (RVIs).

POLAL 218 in HAL 204 receives a message "hal_policy_create (lag 3, policy y)" from POLM 214 in APPS 202 (step 402).

POLAL 218 in HAL 204 determines a distribution scope and a destination endpoint ID for the message "halag_policy_create (lag 3, policy y)" (step 404). In the exemplary embodiment, POLAL 218 in HAL 204 determines a distribution scope for the message "halag_policy_create (lag 3, policy y)" based, at least in part on, the received message type, in this case "hal_policy_create". POLAL 218 in HAL 204 determines a destination endpoint ID for the message "halag_policy_create (lag 3, policy y)" based, at least in part on, executing a common function "construct_nisc_epid_interface_scope (interface, local_id). In the exemplary embodiment, POLAL 218 in HAL 204 determines the destination endpoint ID, based, at least in part on, the interface (i.e., lag 3), a local ID (i.e., NISC_EP_POLICY_AGENT), and the one or more switch units retrieved from LIFDB 212 in APPS 202 corresponding with entry "lag 3" (i.e., multicast group ID) in LIFDB 212 in APPS 202.

POLAL 218 in HAL 204 sends the message "halag_policy_create (lag 3, policy y)" to the correct policy agent for the interface (i.e., lag 3), such as POLA 222 of HALA 206(a) and POLA 222 of HALA 206(b) (step 406). POLA 222 of HALA 206(a) and POLA 222 of HALA 206(b) sends the message "sal_policy_create (lag 3, policy y)" to the corresponding switch unit in hardware 208(a) and hardware 208(b) for lag 3 for programming.

Figure 5:
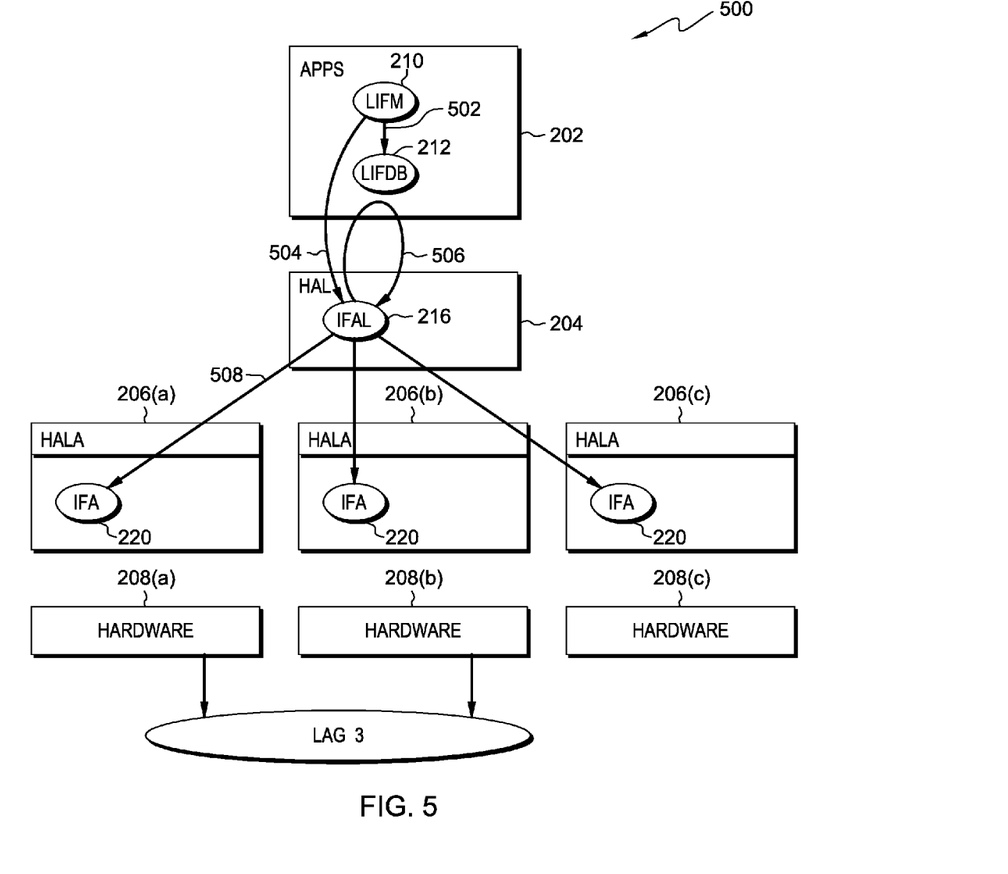
FIG. 5 depicts a functional flow diagram illustrating the steps for creating multicast group IDs, in accordance with an embodiment of the present invention.

FIG. 5 depicts a functional flow diagram, generally designated 500, illustrating the steps for creating multicast group IDs, in accordance with an embodiment of the present invention.

LIFM 210 in APPS 202 creates an entry, such as "lag 3" in LIFDB 212 representing a new LAG (step 502).

LIFM 210 in APPS 202 sends a message "hal_lif_create (lag 3)" to IFAL 216 in HAL 204 (step 504).

IFAL 216 of HAL 204 retrieves a list including a plurality of member physical and virtual links from LIFDB 212 for the entry "lag 3" (step 506). IFAL 216 in HAL 204 retrieves one or more switch units for each member physical and virtual link in the plurality of member physical and virtual links, and determines the group of the one or more switch units where interface "lag 3" resides.

IFAL 216 of HAL 204 sends a message "nisc_mcast_group_create" to the NISC library. The multicast group ID returned by the NISC library is stored in LIFDB 212 under the entry "lag 3", representing the group of one or more switch units where interface "lag 3" resides. IFAL 216 updates the NISC library with the group of switch units where the interface "lag 3" resides, using the multicast group ID. IFAL 216 of HAL 204 sends a message "halag_lif_create (lag 3)" to all interface agents in the distributed system, such as IFA 220 of HALA 206(a), IFA 220 of HALA 206(b), and IFA 220 of HALA 206(c) for programming the one or more switch units for the interface in the hardware, such as hardware 208(a), hardware 208(b), and hardware 208(c) (step 508).

Figure 6:
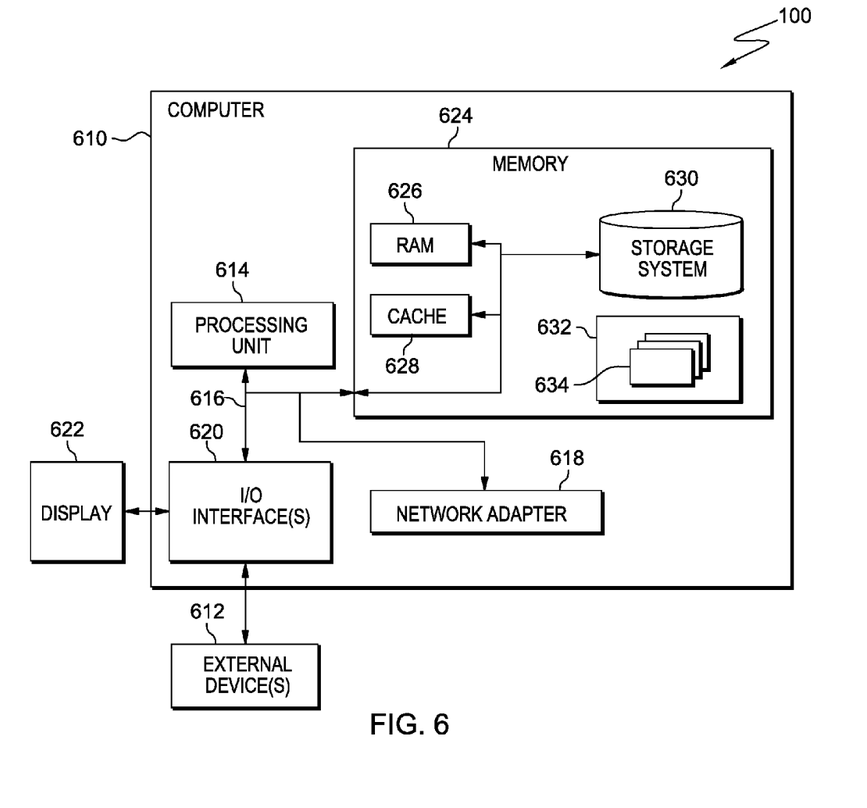
FIG. 6 is a block diagram of components of data processing system 100, in accordance with an illustrative embodiment of the present invention.

FIG. 6 is a block diagram of components of data processing system 100, in accordance with an illustrative embodiment of the present invention. It should be appreciated that FIG. 6 provides only an illustration of one implementation and does not imply any limitations with regard to the environments in that different embodiments may be implemented. Many modifications to the depicted environment may be made.

Computer system 610 in data processing system 100 is shown in the form of a general-purpose computing device. The components of computer system 610 may include, but are not limited to, one or more processors or processing units 614, a system memory 624, and a bus 616 that couples various system components including system memory 624 to processing unit 614.

Bus 616 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 610 typically includes a variety of computer system readable media. Such media may be any available media that is accessible by computer system 610, and it includes both volatile and non-volatile media, removable and non-removable media.

System memory 624 can include computer system readable media in the form of volatile memory, such as random access memory (RAM) 626 and/or cache memory 628. Computer system 610 may further include other removable/non-removable, volatile/non-volatile computer system storage media. By way of example only, storage system 630 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 616 by one or more data media interfaces. As will be further depicted and described below, system memory 624 may include at least one computer program product having a set (e.g., at least one) of program modules that are configured to carry out the functions of embodiments of the invention.

Program/utility 632, having one or more sets of program modules 634, may be stored in memory 624 by way of example, and not limitation, as well as an operating system, one or more application programs, other program modules, and program data. Each of the operating systems, one or more application programs, other program modules, and program data, or some combination thereof, may include an implementation of a networking environment. Program modules 634 generally carry out the functions and/or methodologies of embodiments of the invention as described herein. Computer system 610 may also communicate with one or more external devices 612 such as a keyboard, a pointing device, a display 622, etc., one or more devices that enable a user to interact with computer system 610 and any devices (e.g., network card, modem, etc.) that enable computer system 610 to communicate with one or more other computing devices. Such communication can occur via Input/Output (I/O) interface(s) 620. Still yet, computer system 610 can communicate with one or more networks such as a local area network (LAN), a general wide area network (WAN), and/or a public network (e.g., the Internet) via network adapter 618. As depicted, network adapter 618 communicates with the other components of computer system 610 via bus 616. It should be understood that although not shown, other hardware and software components, such as microcode, device drivers, redundant processing units, external disk drive arrays, RAID systems, tape drives, and data archival storage systems may be used in conjunction with computer system 610.

The flowcharts and block diagrams in the figures illustrate the architecture, functionality, and operation of possible implementations of methods and systems according to various embodiments of the present invention. In this regard, each block in the flowcharts or block diagrams may represent a module, segment, or portion of code, which comprises one or more executable instructions for implementing the specified logical functions. It should be noted that, in some alternative implementations, the functions noted in the blocks may occur out of the order noted in the figures. For example, two blocks shown in succession may, in fact, be executed substantially concurrently, or the blocks may sometimes be executed in the reverse order, or the blocks may sometimes be executed any number of steps prior to, or subsequent to, their current place in the order, depending on the functionality involved.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a," "an," and "the" are intended to include the plural forms as well, unless the context clearly indicates otherwise.

The description of the present invention has been presented for purposes of illustration and description, but is not intended to be exhaustive or limited to the invention in the form disclosed. Many modifications and variations will be apparent to persons of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for forwarding plane support in a distributed system utilizing a three-tiered architecture, the method comprising:
   receiving, by one or more computer processors, one or more messages, wherein the one or more messages include a plurality of state information;
   determining, by the one or more computer processors, a distribution scope for the one or more messages based, at least in part, on the plurality of state information, wherein the distribution scope is selected from a group consisting of: a global distribution scope, an interface distribution scope, a virtual local area network (VLAN) distribution scope, a virtual routing and forwarding instance (VRF) distribution scope, and a specific logical switch router (LSR) distribution scope;
   determining, by the one or more computer processors, a destination endpoint ID for the one or more messages, wherein the destination endpoint ID identifies one or more switch units to receive the one or more messages; and
   sending, by the one or more computer processors, the one or more messages to a distributed forwarding plane for distribution to the one or more switch units based, at least in part, on the distribution scope and the destination endpoint ID, wherein sending includes distributing the plurality of state information from a control plane to the distributed forwarding plane, based, at least in part, on the distribution scope for the plurality of state information and the destination endpoint ID via the three-tiered software architecture, wherein the three-tiered software architecture includes:
   an application layer, wherein the application layer includes one or more applications, a logical interface manager, a logical interface database, a policy manager and one or more protocols for sending the plurality of state information to one or more corresponding components within a hardware abstraction layer, without direct indication of which one or more switch units to distribute the plurality of state information;
   the hardware abstraction layer, wherein the hardware abstraction layer includes an interface abstraction layer and a policy abstraction layer for the one or more applications, and one or more protocols for distributing the plurality of state information to the distributed forwarding plane based, at least in part, on the distribution scope for the plurality of state information; and
   a hardware abstraction layer agent, wherein the hardware abstraction layer agent operates on a specific switch unit of the one or more switch units and includes an interface agent and a policy agent for one or more applications and one or more protocols for maintaining a view of the plurality of state information related to programming of the specific switch unit.

2. The method of claim 1, wherein determining a distribution scope for the one or more messages, further comprises:
   determining, by the one or more computer processors, a message type from the one or more messages.

3. The method of claim 1, wherein determining a destination endpoint ID for the one or more messages, further comprises:
   determining, by the one or more computer processors, interface state information for the one or more messages based, at least in part on, extracting the interface state information from the one or more messages.

4. The method of claim 3 further comprises:
   retrieving, by the one or more computer processors, information corresponding to a group ID.

5. The method of claim 4, wherein retrieving information corresponding to a group ID, further comprises:
   retrieving, by the one or more computer processors, the group ID from a logical interface database, wherein the information includes the one or more switch units corresponding to the group ID and an ID for the one or more switch units.

6. The method of claim 1, wherein sending the one or more messages to a forwarding plane agent, further comprises:
   sending, by the one or more computer processors, the one or more messages to the one or more switch units corresponding to the destination endpoint ID of the one or more messages.

7. The method of claim 1, further comprises:
determining, by the one or more computer processors, the one or more switch units to receive the plurality of state information distributed from the control plane to the distributed forwarding plane.

8. A computer program product for forwarding plane support in a distributed system utilizing a three-tiered architecture, the computer program product comprising:
one or more computer readable storage devices and program instructions stored on the one or more computer readable storage devices, the program instructions comprising:
program instructions to receive, by one or more computer processors, one or more messages, wherein the one or more messages include a plurality of state information;
program instructions to determine, by one or more computer processors, a distribution scope for the one or more messages based, at least in part, on the plurality of state information, wherein the distribution scope is selected from a group consisting of: a global distribution scope, an interface distribution scope, a virtual local area network (VLAN) distribution scope, a virtual routing and forwarding instance (VRF) distribution scope, and a specific logical switch router (LSR) distribution scope;
program instructions to determine, by one or more computer processors, a destination endpoint ID for the one or more messages, wherein the destination endpoint ID identifies one or more switch units to receive the one or more messages; and
program instructions to send, by one or more computer processors, the one or more messages to a distributed forwarding plane for distribution to the one or more switch units based, at least in part, on the distribution scope and the destination endpoint ID, wherein sending includes distributing the plurality of state information from a control plane to the distributed forwarding plane, based, at least in part, on the distribution scope for the plurality of state information and the destination endpoint ID via the three-tiered software architecture, wherein the three-tiered software architecture includes:
an application layer, wherein the application layer includes one or more applications, a logical interface manager, a logical interface database, a policy manager and one or more protocols for sending the plurality of state information to one or more corresponding components within a hardware abstraction layer, without direct indication of which one or more switch units to distribute the plurality of state information;
the hardware abstraction layer, wherein the hardware abstraction layer includes an interface abstraction layer and a policy abstraction layer for the one or more applications, and one or more protocols for distributing the plurality of state information to the distributed forwarding plane based, at least in part, on the distribution scope for the plurality of state information; and
a hardware abstraction layer agent, wherein the hardware abstraction layer agent operates on a specific switch unit of the one or more switch units and includes an interface agent and a policy agent for one or more applications and one or more protocols for maintaining a view of the plurality of state information related to programming of the specific switch unit.

9. The computer program product of claim 8 further comprises program instructions to determine a distribution scope for the one or more messages based, at least in part on, extracting a message type from the one or more messages.

10. The computer program product of claim 8, wherein program instructions to determine a destination endpoint ID for the one or more messages, further comprises program instructions to extract interface state information from the one or more messages, wherein extracting interface state information includes retrieving information corresponding to a group ID.

11. The computer program product of claim 10 further comprises retrieving information corresponding to a group ID.

12. The computer program product of claim 11, wherein program instructions to retrieve information corresponding to a group ID, further comprises program instructions to retrieve the group ID from a logical interface database, wherein the information includes the one or more switch units corresponding to the group ID and an ID for the one or more switch units.

13. The computer program product of claim 8, wherein program instructions to send the one or more messages to a forwarding plane agent, further comprises program instructions to send the one or more messages to the one or more switch units corresponding to the destination endpoint ID of the one or more messages.

14. The computer program product of claim 8, further comprises:
program instructions to determine the one or more switch units to receive the plurality of state information distributed from the control plane to the distributed forwarding plane.

* * * * *